(12) United States Patent
Sekiya et al.

(10) Patent No.: US 10,897,067 B2
(45) Date of Patent: Jan. 19, 2021

(54) COOLING STRUCTURE FOR VEHICLE BATTERY

(71) Applicant: SUBARU CORPORATION, Tokyo (JP)

(72) Inventors: Yasuhiro Sekiya, Tokyo (JP); Hatsuhisa Ueda, Tokyo (JP); Minori Niwa, Tokyo (JP); Kenji Inakoshi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 79 days.

(21) Appl. No.: 16/410,809

(22) Filed: May 13, 2019

(65) Prior Publication Data

US 2019/0372185 A1 Dec. 5, 2019

(30) Foreign Application Priority Data

Jun. 5, 2018 (JP) ................................. 2018-107639

(51) Int. Cl.
| | |
|---|---|
| *H01M 10/6567* | (2014.01) |
| *H01M 10/613* | (2014.01) |
| *H01M 10/6554* | (2014.01) |
| *H01M 10/6551* | (2014.01) |
| *H01M 10/625* | (2014.01) |

(52) U.S. Cl.
CPC ..... *H01M 10/6567* (2015.04); *H01M 10/613* (2015.04); *H01M 10/625* (2015.04); *H01M 10/6551* (2015.04); *H01M 10/6554* (2015.04); *H01M 2220/20* (2013.01)

(58) Field of Classification Search
CPC ........... H01M 10/613; H01M 10/6551; H01M 2220/20; B60L 58/26
See application file for complete search history.

(56) References Cited

U.S. PATENT DOCUMENTS

| | | | | |
|---|---|---|---|---|
| 2012/0177960 A1* | 7/2012 | Tasai | ................... | H01M 10/643 429/72 |
| 2017/0284062 A1* | 10/2017 | Osaka | ..................... | E02F 9/267 |

FOREIGN PATENT DOCUMENTS

| | | |
|---|---|---|
| JP | 2011-049139 A | 3/2011 |
| JP | 2012-156010 A | 8/2012 |
| JP | 2015-106531 A | 6/2015 |
| JP | 2015-230797 A | 12/2015 |
| JP | 2016-024935 A | 2/2016 |

OTHER PUBLICATIONS

Japanese Office Action, dated May 26, 2020, in Japanese Application No. 2018-107639 and English Translation thereof.

* cited by examiner

*Primary Examiner* — Ladan Mohaddes

(74) *Attorney, Agent, or Firm* — McGinn IP Law Group, PLLC

(57) ABSTRACT

A cooling structure for a vehicle battery includes a battery module, a heat transfer sheet, a cooling water circulation pipe line, and a cooling-water storage chamber. In the battery module, battery cells are arranged in one direction. The heat transfer sheet is fixed to a lower surface of the battery module. The cooling water circulation pipe line faces the lower surface of the battery module with being in contact with the heat transfer sheet. The cooling-water storage chamber is of a non-circulation type and disposed below the battery module while in contact with a lower surface of the cooling water circulation pipe line.

6 Claims, 4 Drawing Sheets

COOLING STRUCTURE FOR VEHICLE BATTERY

CROSS-REFERENCE TO RELATED APPLICATIONS

The present application claims priority from Japanese Patent Application No. 2018-107639 filed on Jun. 5, 2018, the entire contents of which are hereby incorporated by reference.

BACKGROUND

The disclosure relates to a cooling structure for a vehicle battery, and more particularly to a cooling structure for a vehicle battery in which a cooling water storage chamber is disposed below a cooling water circulation pipe line to increase heat capacity and improve heat exchange efficiency, thereby preventing battery cells from emitting smoke in an accelerated manner.

The cooling structure illustrated in FIG. 5 is a cooling structure that is known as a conventional battery cooling structure 100. FIG. 5 is a side cross-sectional view illustrating the conventional battery cooling structure 100.

As illustrated in FIG. 5, the battery cooling structure 100 mainly consists of a cool air duct 103 for guiding cooling air from an air-conditioner 101 to a battery unit 102 for storing electrical power to drive the vehicle, a cooling water circulation pipe 104 through which cooling water CW for cooling the battery unit 102 is circulated, a heat exchanger 106 for exchanging heat between the cooling water CW in a cooling water tank 105 and refrigerant from a refrigeration cycle of the air-conditioner 101, and a cooling water pump 107, provided to the cooling water circulation pipe 104, for circulate the cooling water CW.

The battery cooling structure 100 has a strong cooling mode of the battery pack 102A when the battery pack 102A of the battery unit 102 is being charged, automatically or in response to an operation of an operation switch. In the strong cooling mode, in addition to being cooled by the cooling air flowing in the cool air duct 103, the battery pack 102A can also be cooled with the cooling water CW flowing in the cooling water circulation pipe 104 by operating the cooling water pump 107.

SUMMARY

An aspect of the disclosure provides a cooling structure for a vehicle battery. The structure includes a battery module, a heat transfer sheet, a cooling water circulation pipe line, and a cooling-water storage chamber. In the battery module, battery cells are arranged in one direction. The heat transfer sheet is fixed to a lower surface of the battery module. The cooling water circulation pipe line faces the lower surface of the battery module with being in contact with the heat transfer sheet. The cooling-water storage chamber is of a non-circulation type and disposed below the battery module while in contact with a lower surface of the cooling water circulation pipe line.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
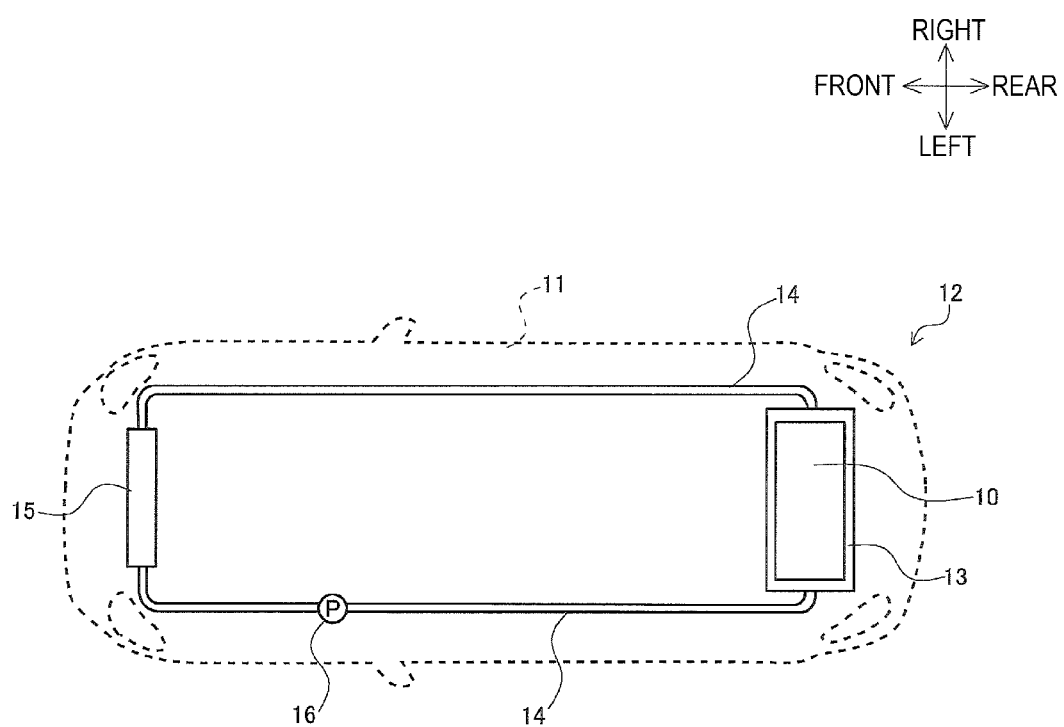
FIG. 1 is a schematic diagram illustrating a vehicle having a cooling structure for a vehicle battery according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. As described above, in the battery cooling structure 100, it is possible to cool the battery unit 102, to improve heat exchange efficiency, by properly using two cooling systems: a first cooling system for cooling by running cooling air through the cool air duct 103 and a second cooling system for running cooling water CW through the cooling water circulation pipe 104.

When the battery pack 102A is operating normally, such as when the battery pack 102A is charged, the battery pack 102A is properly cooled by simultaneously using the two cooling systems. However, when the battery pack 102A generates abnormal heat or smoke, the two cooling systems could become unable to handle the cooling operation, leading to an emission of smoke in an accelerated manner from the adjacent battery pack 102A.

Although the second cooling system using cooling water CW is superior in cooling efficiency to the first cooling system using cooling air, it is assumed that, in the battery cooling structure 100, the second cooling system is used in combination with the first cooling system, and the pipe diameter of the cooling water circulation pipe 104 is small and the contacting surface area between the battery pack 102A and the cooling water circulation pipe 104 is also small. Therefore, since the heat capacity is small and the heat exchange efficiency is poor, when the battery pack 102A generates abnormal heat, it is difficult to prevent the adjacent battery pack 102A from emitting smoke in an accelerated manner.

It is therefore desirable to provide a cooling structure for a vehicle battery in which a cooling water storage chamber is disposed below a cooling water circulation pipe line to increase heat capacity and improve heat exchange efficiency, thereby preventing battery cells from generating smoke in an accelerated manner.

Figure 2A:
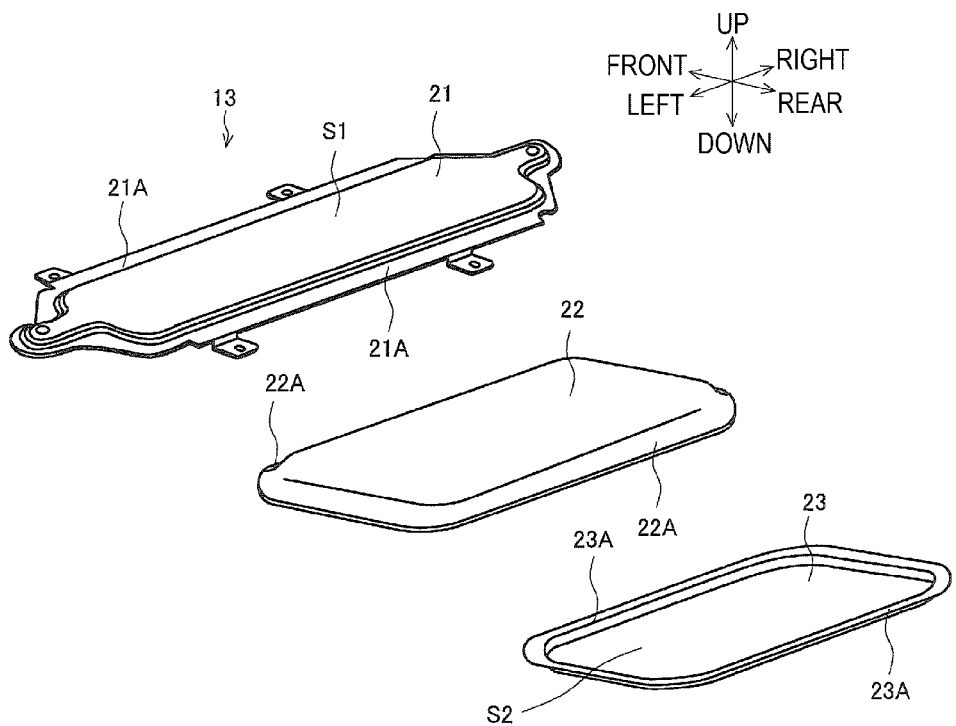
FIG. 2A is an exploded perspective view illustrating a cooling structure for a vehicle battery according to the embodiment of the disclosure.
Figure 2B:
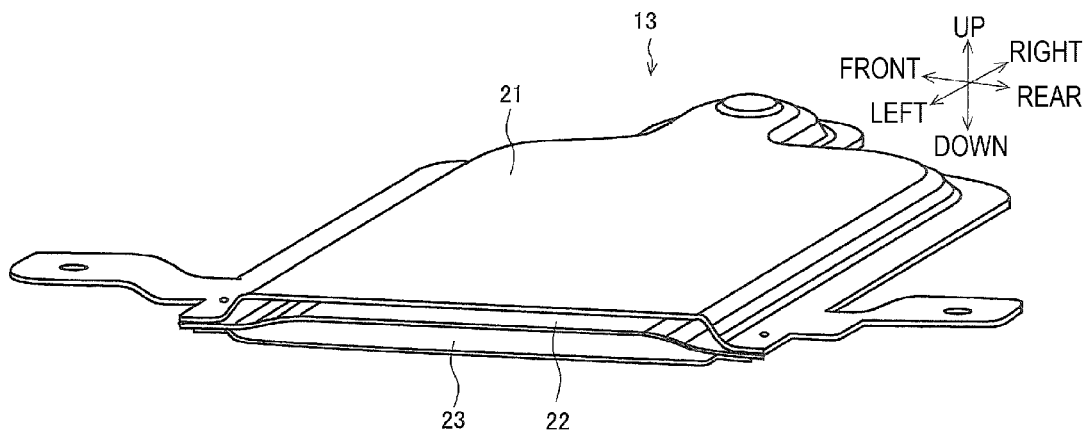
FIG. 2B is a cross-sectional perspective view illustrating a cooling structure for a vehicle battery according to the embodiment of the disclosure.
Figure 3A:
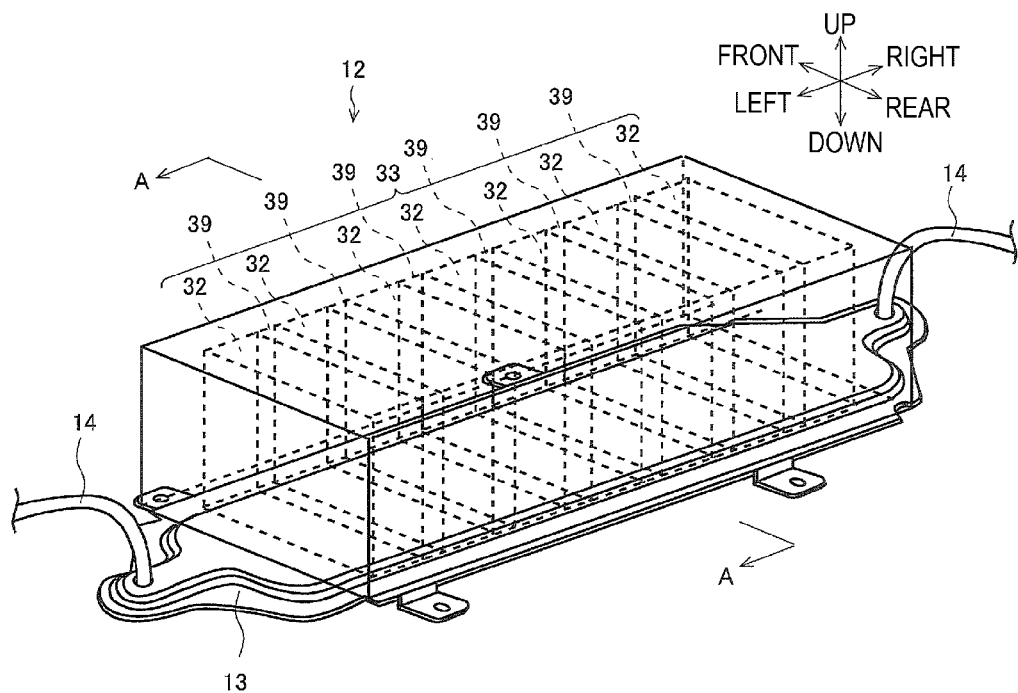
FIG. 3A is a perspective view illustrating the cooling structure for a vehicle battery according to the embodiment of the disclosure.
Figure 3B:
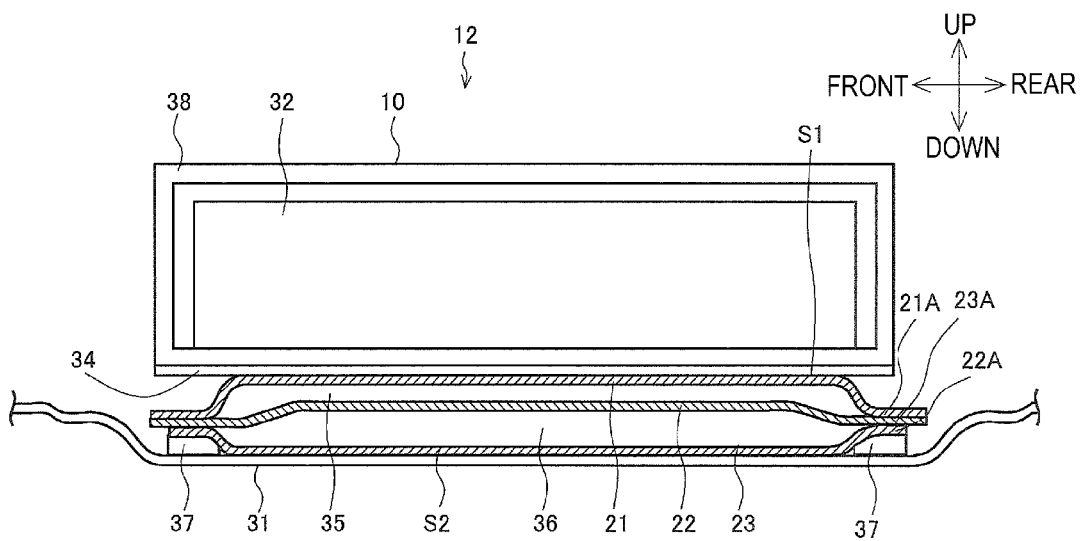
FIG. 3B is a cross-sectional view illustrating the cooling structure for a vehicle battery according to the embodiment of the disclosure.
Figure 4:
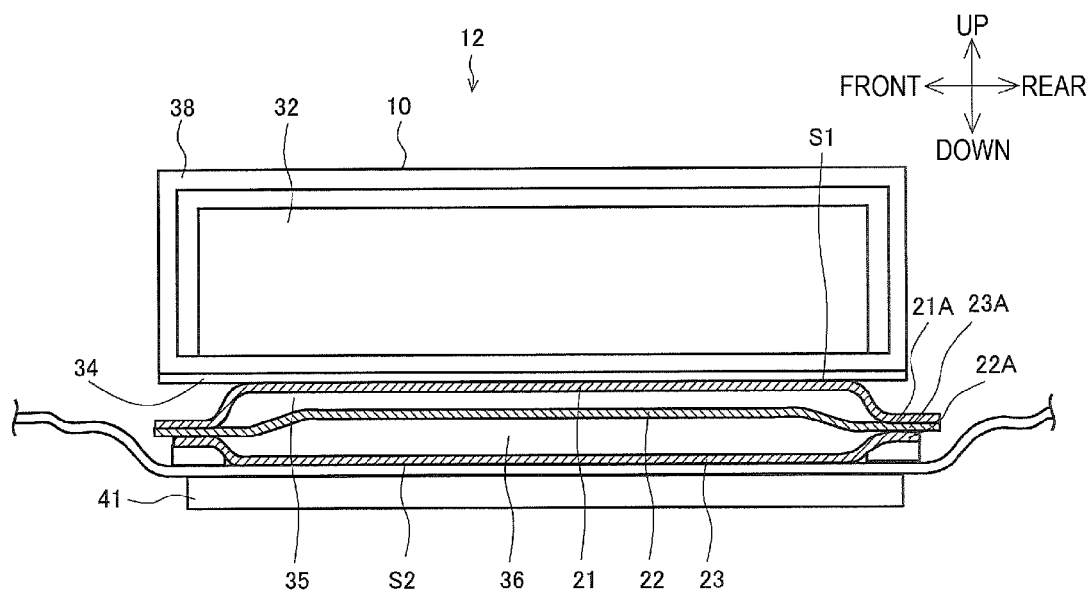
FIG. 4 is a cross-sectional view illustrating a modification of the cooling structure for a vehicle battery according to the embodiment of the disclosure.
Figure 5:
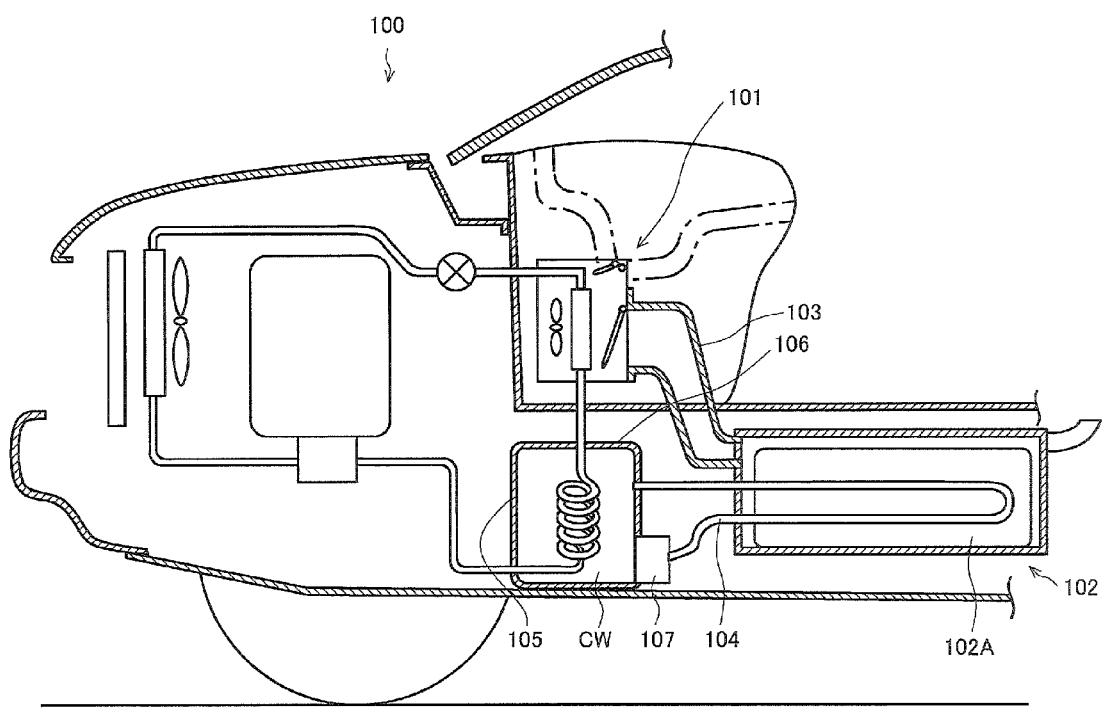
FIG. 5 is a side cross-sectional view illustrating a conventional battery cooling structure.

FIG. 1 is a schematic diagram illustrating a vehicle 11 having a cooling structure 12 for a vehicle battery 10 according to the embodiment of the disclosure. FIG. 2A is an exploded perspective view illustrating the cooling structure 12 for the vehicle battery 10 of the present embodiment. FIG. 2B is a cross-sectional perspective view illustrating the cooling structure 12 for the vehicle battery 10 of the present embodiment. FIG. 3A is a perspective view illustrating the cooling structure 12 for the vehicle battery 10 of the present embodiment. FIG. 3B is a cross-sectional view illustrating the cooling structure 12 for the vehicle battery 10 of the present embodiment. FIG. 4 is a cross-sectional view illustrating a modification of the cooling structure 12 for the vehicle battery 10 of the present embodiment.

Vehicle batteries 10 for supplying electrical power to motors and various electrical components are mounted on vehicles 11 such as automobiles and trains. In recent years, in the case of automobiles as vehicles 11, EV (Electrical Vehicle), HEV (Hybrid Electrical Vehicle), PHEV (Plug-in Hybrid Electrical Vehicle) and the like have become widespread, and vehicle batteries 10 having a high power storage function are also mounted in these vehicles 11.

As illustrated in FIG. 1, the vehicle battery 10 is disposed, for example, in a storage space below the rear floor of the vehicle 11, and the vehicle battery 10 is disposed so that its longitudinal direction coincides with the vehicle width direction of the vehicle 11. A water-cooling integrated temperature control housing 13 for cooling the vehicle battery 10 (hereinafter referred to as "temperature control housing 13") is disposed on the lower surface of the vehicle battery 10. The vehicle battery 10 is not limited to the case where it is disposed below the rear floor, and may be disposed below the front floor or the like where the driver's seat or a passenger's seat in the front of the vehicle 11 is disposed.

As will be described later in detail, the temperature control housing 13 is formed by stacking three metal plates 21, 22, 23 (see FIG. 2A), and the internal space of the temperature control housing 13 is partitioned into two internal spaces in the vertical direction. The upper internal space of the temperature control housing 13 is used as a cooling water storage section 35 (see FIG. 3B) which is temporarily filled with cooling water circulating in the vehicle 11. The lower internal space of the temperature control housing 13 is a closed non-circulation space, and is used as a cooling water storage chamber 36 (see FIG. 3B) in which, upon being filled up with cooling water, the cooling water is kept there stagnant.

A cooling water circulation pipe line 14 for circulating cooling water in the vehicle 11 is connected to the cooling water storage section 35 of the temperature control housing 13, and a cooling water circulation pipe line is formed by both members. The cooling water circulation pipe line 14 is connected to, for example, a radiator 15 of the vehicle 11, and the cooling water heated by heat exchange with the vehicle battery 10 in the cooling water storage section 35 is cooled by heat exchange with the outside air passing through the radiator 15 and is sent to the cooling water storage section 35 again. That is, the cooling water is circulated between the temperature control housing 13, the cooling water circulation pipe line 14, and the radiator 15 via a cooling water pump 16 while repeating heat exchange, thereby achieving the function of the cooling structure 12 of the water-cooled vehicle battery 10.

As illustrated in FIG. 2A, the temperature control housing 13 consists of three metal plates 21, 22, 23 formed by a drawing process. In consideration of the cooling efficiency of the vehicle battery 10 (see FIG. 3A), weight reduction of the vehicle 11, and the like, the metal plates 21, 22, 23 may be made of aluminum, which has excellent thermal conductivity. Further, plates with a substantially rectangular shape corresponding to the lower surface shape of the vehicle battery 10 are used as the metal plates 21, 22, 23 so as to ensure that as much of the region as possible faces the vehicle battery 10.

As illustrated in FIG. 2B, loop-shaped connecting fixing regions 21A, 22A, 23A are formed along the outer peripheral edge of the metal plates 21, 22, 23, respectively, and the fixing regions 21A, 22A, 23A are aligned and fixed by bolt-fastening or the like to form the temperature control housing 13.

The upper surface of the temperature control housing 13 has a flat region S1, and the flat region S1 is a region in contact with a heat transfer sheet 34 (see FIG. 3B) adhered to the lower surface of the vehicle battery 10, and heat exchange efficiency can be improved by increasing the contact region. The lower surface of the temperature control housing 13 also has a flat region S2, and the flat region S2 is a region in contact with a bottom plate 31 (see FIG. 3B) of the vehicle 11, and heat exchange efficiency can be improved by increasing the contact region here as well.

As illustrated in FIG. 3A, the cooling structure 12 of the vehicle battery 10 mainly consists of the vehicle battery 10, the temperature control housing 13 disposed on the lower surface of the vehicle battery 10, and the cooling water circulation pipe line 14 connected to the temperature control housing 13.

The vehicle battery 10 mainly consists of a storage box (see FIG. 3B) and a battery module 33 configured by connecting a plurality of battery cells 32 stored in the storage box 38 in series. Each battery cell 32 is, for example, a rechargeable battery such as a nickel hydrogen battery or a lithium ion battery. The individual battery cells 32 have, for example, a flat rectangular parallelepiped shape, and are arranged at equal intervals along the vehicle width direction (i.e., the left-right direction of the paper sheet) of the vehicle 11 with insulating layers 39 (see FIG. 3B) sandwiched therebetween.

Each insulating layer 39 is a member for electrically insulating adjacent battery cells 32 from each other. Further, each insulating layer 39 is made of a material having poor heat conductivity, such as porous foam resin, and has a structure that makes it difficult for heat to be transmitted to adjacent battery cells 32 when a battery cell 32 generates abnormal heat.

FIG. 3B is a cross sectional view illustrating the cooling structure 12 for the vehicle battery 10 as viewed along the line A-A in FIG. 3A. As described above, the vehicle battery 10 is disposed in the storage space below the rear floor of the vehicle 11. The bottom plate 31 of the vehicle 11 is a floor panel made of sheet metal, and the temperature control housing 13 is fixed to the upper surface of the bottom plate 31 by bolt-fastening so that the flat region S2 of the temperature control housing 13 comes into contact with the bottom plate 31. The vehicle battery 10 having the heat transfer sheet 34 bonded to its lower surface is disposed on the upper surface of the temperature control housing 13, and the flat region S1 of the temperature control housing 13 is in contact with the heat transfer sheet 34.

The temperature control housing 13 consists of the three metal plates 21, 22, 23 which are formed by a drawing process, the outer shape of the temperature control housing 13 is formed by the metal plates 21, 23, and the inner space is divided into two inner spaces in the vertical direction by the metal plate 22. The upper internal space of the temperature control housing 13 is used as the cooling water storage section 35 for storing cooling water for cooling the vehicle battery 10. On the other hand, the lower internal space of the temperature control housing 13 is used as the cooling water storage chamber 36 in which cooling water for discharging heat to the outside of the vehicle 11 is kept therein stagnant, the heat being the heat generated when the individual battery cells 32 generate abnormal heat.

The cooling water storage section 35 is connected to the cooling water circulation pipe line 14 for circulating cooling water in the vehicle 11 and functions as a part of the cooling water circulation pipe line 14. The cooling water storage section 35 has a larger pipe cross-section than that of the cooling water circulation pipe line 14, and the cooling water flowing in the cooling water circulation pipe line 14 is temporarily stored in the cooling water storage section 35 during cooling water circulation. As illustrated in FIG. 3A, the flat region S1 of the cooling water storage section 35 is slightly smaller than the lower surface of the vehicle battery 10 but has substantially the same area, and the cooling water circulation pipe line 14 is connected to the cooling water storage section 35 at both ends of the flat region S1 in the longitudinal direction (i.e., the left-right direction of the paper sheet).

With this structure, the cooling water, while flowing more slowly in the cooling water storage section 35 than in the cooling water circulation pipe line 14, exchanges heat with the battery module 33 via the heat transfer sheet 34, thereby cooling the vehicle battery 10. Further, by disposing the cooling water storage section 35 between the two cooling water circulation pipe lines 14, a large region interfacing with the lower surface of the vehicle battery 10 is ensured by the flat region S1 of the cooling water storage section 35, whereby heat capacity is also increased and excellent cooling performance of the cooling structure 12 for the vehicle battery 10 is achieved.

The cooling water storage chamber 36 is a closed non-circulation space and has a structure in which, upon being filled up with cooling water, the cooling water is kept there stagnant. An antifreeze that does not freeze throughout the year may be used as the cooling water. As illustrated in the figure, the cooling water in the cooling water storage section 35 and the cooling water in the cooling water storage chamber 36 are separated by the metal plate 22, but as described above, the metal plate 22 is made of a material having excellent heat conductivity, thereby increasing the heat capacity and improving the heat exchange efficiency of the temperature control housing 13 as a whole.

The purpose of the cooling water in the cooling water storage chamber 36 is mainly to exchange heat when the individual battery cells 32 in the battery module 33 generate abnormal heat and to discharge the generated heat to the outside of the vehicle. Each battery cell 32 is in contact with an insulating layer 39 on the front and rear surfaces thereof and is in contact with the temperature control housing 13, which has excellent heat exchange efficiency, on the lower surface thereof.

With this structure, in a battery cell 32 which has generated abnormal heat, heat is mainly exchanged with the temperature control housing 13 having a large heat capacity, which makes it difficult to transmit the generated heat to adjacent battery cells 32. Further, as described above, it is also difficult for the generated heat to be transmitted to the adjacent battery cells 32 by the insulating layers 39 arranged between the adjacent battery cells 32. Therefore, normal battery cells 32 adjacent to battery cells 32 that is generating abnormal heat are prevented from generating smoke in an accelerated manner due to the heat.

As illustrated in FIG. 3B, an insulating base 37 is disposed along the outer peripheral edge of the temperature control housing 13 between the temperature control housing 13 and the bottom plate 31 of the vehicle 11. The insulating base 37 has an annular shape along the outer peripheral edge of the temperature control housing 13. The fixing regions 21A, 22A, 23A of the temperature control housing 13 and the peripheral regions thereof are supported by the insulating base 37 from below.

With this structure, the temperature control housing 13 receives a reaction force from the insulating base 37 and has a shape warped toward the vehicle battery 10, and the flat region S1 of the temperature control housing 13 is pressed against the heat transfer sheet 34 on the lower surface of the vehicle battery 10, thereby increasing the contact region between the flat region S1 and the heat transfer sheet 34 and improving the cooling efficiency. Further, since the temperature control housing 13 has a shape warped toward the vehicle battery 10, it is difficult for a gap due to aging to form between the heat transfer sheet 34 and the temperature control housing 13, thereby preventing deterioration of the cooling efficiency.

As illustrated in FIG. 4, a cooling fin 41 protruding to the outside of the vehicle may be formed on the bottom plate 31 of the vehicle 11 in the region where the temperature control housing 13 is disposed. The flat region S2 of the temperature control housing 13 comes into contact with the bottom plate 31 of the vehicle 11 and the cooling water in the cooling water storage chamber 36 exchanges heat with the air outside the vehicle via the bottom plate 31, whereby heat generated when the battery cell 32 generates abnormal heat can be easily discharged to the outside of the vehicle 11.

In some embodiments, a plurality of the cooling fins 41 is disposed. Although not illustrated, the cooling fins 41 are arranged at regular intervals in the vehicle width direction of the vehicle 11 so that the contact area with the air outside the vehicle increases and the cooling efficiency of the bottom plate 31 improves. The individual cooling fins 41 are plate-like members and extend from the front to the rear of the vehicle 11, thereby avoiding deterioration of aerodynamic characteristics on the lower surface of the vehicle 11.

In the present embodiment, a case has been described in which the integrated temperature control housing 13 is disposed on the lower surface of the vehicle battery 10, and when a part of the vehicle battery 10 generates abnormal heat, the heat capacity is increased by the cooling water storage chamber 36 of the temperature control housing 13 to improve heat exchange efficiency, thereby preventing the battery cells 32 from generating smoke in an accelerated manner, but the disclosure is not limited to this case. For example, even in a cooling structure in which the cooling water circulation pipe line 14 and the cooling water storage chamber are separately formed, the cooling water storage chamber is disposed on the upper surface of the bottom plate 31 of the vehicle 11, the cooling water circulation pipe line 14 is disposed so as to contact the upper surface of the cooling water storage chamber, and the vehicle battery 10 is disposed on the upper surface of the cooling water circulation pipe line 14, the same effects as those described above can be obtained.

Although a case has been described in which, in addition to the cooling water storage section 35 of the temperature control housing 13, the cooling water circulation pipe line 14 is connected to the radiator of the vehicle 11 and the cooling water flowing in the cooling water circulation pipe line 14 is cooled by heat exchange with the radiator 15, the disclosure is not limited to this case. For example, the cooling water circulation pipe line 14 may be connected to a heat core of a vehicle air-conditioner of the vehicle 11 in addition to being connected to the cooling water storage section 35 of the temperature control housing 13. Even in this case, the cooling water flowing in the cooling water circulation pipe line 14 may be cooled by exchanging heat with the outside air in the heat core. Further, the cooling water flowing in the cooling water circulation pipe line 14 may be cooled through a refrigeration cycle in which a cooler, a compressor, a condenser, and an expansion unit disposed in the vehicle 11 are connected through a refrigerant pipe. Even in these cases, the same effects as those described above can be obtained. Further, various modifications can be made without departing from the gist of the disclosure.

In a cooling structure, for a vehicle battery, of the disclosure comprises a battery module in which a plurality of battery cells is arranged in one direction, a cooling water circulation pipe line facing the lower surface of the battery module, and a non-circulation cooling-water storage chamber disposed below the battery module while in contact with the lower surface of the cooling water circulation pipe line. With this structure, the heat capacity under the battery module is increased and the heat exchange efficiency is improved so that adjacent battery cells are prevented from generating abnormal heat and smoke in an accelerated manner when a battery cell generates abnormal heat.

Further, in the cooling structure of the vehicle battery of the disclosure, the cooling water circulation pipe line has a cooling water storage section in which the cooling water flowing through the cooling water circulation pipe line is temporarily stored, the cooling water storage section is disposed on the lower surface of the battery module in a state in which the cooling water storage section is in contact with the heat transfer sheet, and the cooling water storage chamber is disposed on the upper surface of the bottom plate of the vehicle. With this structure, when the battery cell generates abnormal heat, the heat generated in the battery cell is quickly discharged to the outside of the vehicle, whereby adjacent battery cells can be prevented from generating smoke in an accelerated manner due to the heat.

In the cooling structure of the vehicle battery of the disclosure, the cooling water storage section and the cooling water storage chamber are formed as an integrated temperature control housing, and the three metal plates constituting the integrated temperature control housing are made of aluminum, which has excellent thermal conductivity. With this structure, when the battery cell generates abnormal heat, the heat capacity of the integrated temperature control housing is increased and the heat exchange efficiency is improved.

In the cooling structure of the vehicle battery of the disclosure, cooling fins protruding to the outside of the vehicle are formed on the bottom plate of the vehicle below the integrated temperature control housing. With this structure, the heat exchange efficiency in the bottom plate is improved, and when abnormal heat generation occurs in the battery cell, the heat can be quickly discharged to the outside of the vehicle.

In the cooling structure of the vehicle battery of the disclosure, an annular insulating base is disposed along an outer peripheral edge of the integrated temperature control housing, between the integrated temperature control housing and the bottom plate. With this structure, the integrated temperature control housing receives a reaction force from the insulating base and has a shape that is warped toward the vehicle battery so that the contact area between the integrated temperature control housing and the vehicle battery increases and the cooling efficiency improves.

The invention claimed is:

1. A cooling structure for a vehicle battery, the structure comprising:
    a battery module in which battery cells are arranged in one direction;
    a heat transfer sheet fixed to a lower surface of the battery module;
    a cooling water circulation pipe line facing the lower surface of the battery module with being in contact with the heat transfer sheet; and
    a cooling-water storage chamber that is of a non-circulation type and disposed below the battery module while in contact with a lower surface of the cooling water circulation pipe line.

2. The cooling structure for a vehicle battery according to claim 1, wherein
    the cooling water circulation pipe line comprises
    a cooling water storage section in which cooling water flowing through the cooling water circulation pipe line is temporarily stored,
    the cooling water storage section is disposed on the lower surface of the battery module in a state of being in contact with the heat transfer sheet, and a lower surface of the cooling water storage section is in contact with the cooling water storage chamber; and
    the cooling water storage chamber is disposed on an upper surface of a bottom plate of the vehicle.

3. The cooling structure of a vehicle battery according to claim 2, wherein
    the cooling water storage section and the cooling water storage chamber are formed as an integrated temperature control housing;
    the integrated temperature control housing comprises:
    a first metal plate in contact with the heat transfer sheet,
    a second metal plate in contact with the bottom plate, and
    a third metal plate that partitions an internal space formed by the first metal plate and the second metal plate into an upper space as the cooling water storage section and a lower space as the cooling water storage chamber; and
    the first metal plate, the second metal plate, and the third metal plate are made of aluminum.

4. The cooling structure of a vehicle battery according to claim 3, further comprising at least one cooling fins protruding to the outside of the vehicle, the at least one fin being disposed on the bottom plate below the integrated temperature control housing.

5. The cooling structure of a vehicle battery according to claim 3, further comprising
    an annular insulating base disposed along an outer peripheral edge of the integrated temperature control housing, between the integrated temperature control housing and the bottom plate.

6. The cooling structure of a vehicle battery according to claim 4, further comprising
an annular insulating base disposed along an outer peripheral edge of the integrated temperature control housing, between the integrated temperature control housing and the bottom plate.

\* \* \* \* \*